United States Patent [19]

Novak

[11] 4,389,807

[45] Jun. 28, 1983

[54] SHOCK-ABSORBING ANIMAL TRAP

[75] Inventor: Milan Novak, Aurora, Canada

[73] Assignee: Her Majesty the Queen in right of Canada, as represented by the Minister of Natural Resources, Toronto, Canada

[21] Appl. No.: 251,876

[22] Filed: Apr. 7, 1981

[30] Foreign Application Priority Data

Feb. 6, 1981 [CA] Canada .................................. 370256

[51] Int. Cl.³ .......................................... A10M 23/26
[52] U.S. Cl. .............................................. 43/96; 43/87
[58] Field of Search ............... 43/96, 87, 88; 267/169, 267/174, 179, 74

[56] References Cited

U.S. PATENT DOCUMENTS

| | | | |
|---|---|---|---|
| 831,037 | 9/1906 | Campbell | 43/96 |
| 973,213 | 10/1910 | Riday | 43/96 |
| 1,418,603 | 6/1922 | Mortimer | 43/96 |
| 1,913,893 | 6/1933 | Morrill | 43/87 |
| 4,279,094 | 7/1981 | Beck | 43/96 |

FOREIGN PATENT DOCUMENTS 233219 9/1924 United Kingdom .

*Primary Examiner*—Nicholas P. Godici
*Assistant Examiner*—Kurt Rowan
*Attorney, Agent, or Firm*—Sim & McBurney

[57] ABSTRACT

There is provided, for an animal trap having a portion which attaches to an animal when the latter springs the trap, said portion being capable of being affixed with respect to the terrain, the improvement of providing a shock-absorbing capability to the trap. This capability arises through the provision of an apparatus through which the previously mentioned portion can be affixed with respect to the terrain. The apparatus includes a resilient member between the portion attaching to an animal and the fixed location with respect to the terrain, the resilient member being in parallel with a substantially non-resilient connection also between the portion which attaches to an animal and the location of fixing with respect to the terrain. Thus, if the trapped animal should lunge away from the trap, the resilient member will absorb at least some of the resulting shock so that injury to the animal can be minimized. The substantially non-resilient attachment portion is provided to ensure that the resilient member does not exceed its elastic limit during its extension.

4 Claims, 5 Drawing Figures

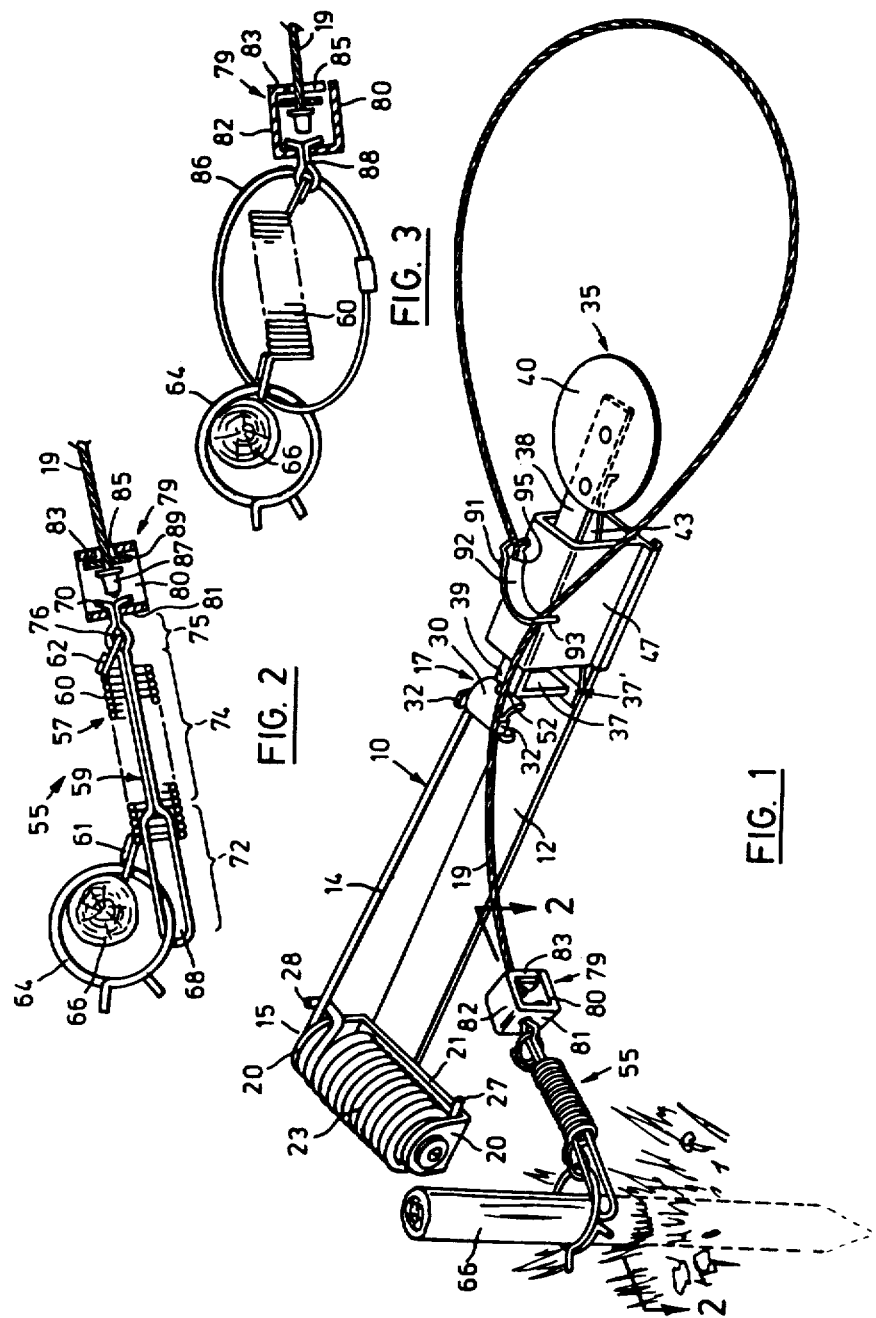

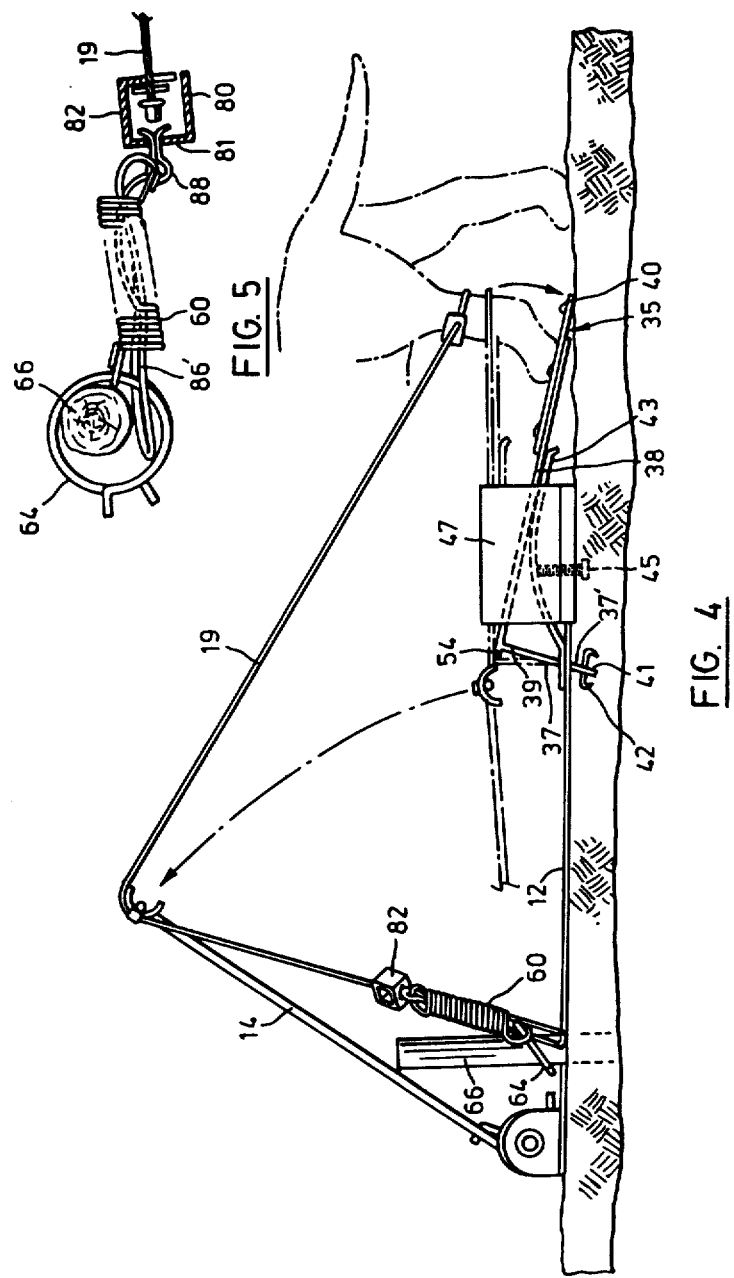

SHOCK-ABSORBING ANIMAL TRAP

This invention relates generally to traps for animals, and has to do particularly with an animal trap designed to cause the minimum of discomfort or injury to the animal. More particularly, this invention has to do with an animal trap design which includes a shock-adsorption capability in order to minimize damage to the animal should it leap or lunge in attempting to free itself from the trap. The construction of the trap is also such as to allow the escape of animals larger than those for which the trap is intended.

BACKGROUND OF THIS INVENTION

Exemplary of the prior art in the general animal trap area is U.S. Pat. No. 3,060,623, J. R. Aldrich, issued Oct. 30, 1962, and entitled "Animal Trap".

The Aldrich device includes two arms with a coil spring between the arms tending to bias them apart, with means at the non-spring end of one of the arms for supporting a trip lever, the lever having inter-engagement portions which retain the other of the spring arms downwardly against the first arm until the trip lever has been depressed, at which point the arms are disengaged from each other, and the one arm flies upwardly with respect to the other. A noose-like cable is positioned to surround the general location of the trip lever, and the cable is then entrained over a catch portion at the non-spring end of the upwardly snapping arm, the other end of the cable being anchored in some way, as to a tree. When the animal presses downwardly on the trip lever, the two arms are disengaged from each other, and spring apart. In so doing, the cable is suddenly jerked tight, and the noose tightens around the foot of the animal.

While the basic construction of Aldrich is simple and reliable in terms of entrapping the animal without causing undue injury, it does not include an provision for protecting the animal against injury after it has become ensnared. Any violet attempt by the animal to free itself by lunging away from the trap could cause physical damage due to the forces exerted on the snared part of the animal. Also, the Aldrich trap is not designed to allow the escape of animals larger than those intended to be caught.

GENERAL DESCRIPTION OF THIS INVENTION

Accordingly, it is an aim of an aspect of this invention to provide an animal trap similar to Aldrich in construction, but which includes a shock-absorbing capability in order to protect the animal from injury subsequent to its ensnarement.

More particularly, this invention provides, in an animal trap having a portion which attaches to an animal when the latter springs the trap, said portion being capable of being affixed with respect to the terrain, the improvement according to which there is provided a shock-absorbing apparatus through which said portion can be affixed with respect to the terrain, the apparatus comprising:

(a) a resilient member inserted between (1) a connection between said portion and said apparatus and (2) a location where said apparatus is affixed with respect to the terrain, whereby if the trapped animal should lunge away from the trap, the resilient member will absorb at least some of the resulting shock so that injury to the animal is minimized, and (b) a non-resilient member attached between said connection and said location, said non-resilient member limiting the extension of said resilient member such that the latter does not exceed its elastic limit during extension.

In a preferred embodiment the resilient member is a coil spring and the non-resilient member is a closed loop of wire which passes through the center of the coil spring and is inter-linked with a ring adapted to engage a stake driven into the ground. The coil spring is also connected to the ring.

In another preferred embodiment, the resilient member is a coil spring and the non-resilient member is an elongated, hairpin-shaped metal clip having a loop at one extremity and two free, adjacent ends at the other extremity. The loop is connected to a ring adapted to engage a stake driven into the ground, and the free ends of the metal clip are attached to a coupling member to which the previously defined portion is also connected. The metal clip passes axially through the coil spring, and the latter is connected at one end to the ring and at the other end to a part of the metal clip adjacent the coupling member.

GENERAL DESCRIPTION OF THE DRAWINGS

Three embodiments of this invention are illustrated in the accompanying drawings, in which like numerals denote like parts throughout the several views, and in which:

FIG. 1 is a perspective view of an animal trap which incorporates the shock-absorbing apparatus of the first embodiment of this invention;

FIG. 2 is a sectional view of the shock-absorbing portion of the trap shown in FIG. 1, taken on the plane designated by the line II—II in FIG. 1;

FIG. 3 shows a second embodiment of the shock-absorbing portion of the trap, in a view similar to that of FIG. 2;

FIG. 4 is an elevational view showing the springing of the trap; and

FIG. 5 shows a third embodiment of the shock-absorbing portion of the trap, in a view similar to that of FIGS. 2 and 3.

PARTICULAR DESCRIPTION OF THE DRAWINGS

Attention is first directed to FIG. 1, which shows an animal trap at 10, which includes a frame member 12, a spring arm 14 pivotally mounted at one end 15 of the frame member 12, and having means 17 at the other end for entraining a cable 19.

More specifically, the spring arm 14 is in the form of a relatively thick wire of which the end at 15 is bent into an L-configuration, and passed through suitable aligned apertures in opposite walls 20 of a bracket 21 which is welded or otherwise affixed to the leftward end of the frame member 12, as seen in FIG. 1. A torque spring 23 encircles the leg of the "L", and has one of its ends 27 bearing downwardly against the bracket 21, and the other of its ends 28 hooked under and urging upwardly against the spring arm 14.

Thus, the frame member 12 and the spring arm 14 are constantly urged away from each other, and since the frame member 12 is intended to lie flatly against the ground, this will mean that the spring arm 14 is constantly urged upwardly in a counter-clockwise pivoting motion, as seen from the foreground in FIG. 1. Thus, the spring arm 14 is mounted for swinging movement in a substantially vertical plane between the first position (that of FIG. 1) in which it extends substantially horizontally and parallel to the frame member 12, and a second position (shown in solid lines in FIG. 4) in which the spring arm 14 extends at an angle upwardly, the angle depending upon the strength of the torque spring 23.

As can be seen in FIG. 1, the means 17 on the end of the spring arm for entraining the cable 19 includes a cylindrical portion 30 which is upwardly convex, and which defines the base of an upwardly-opening U-shaped saddle of which the sides are defined by two tabs 32. The spring arm 14 is bent at right angles at its rightward end, and is welded or otherwise securely affixed under the center of the "saddle" portion 30.

The animal trap further includes a trip lever 35 which is adapted to move between upper and lower positions. The upper position is shown in solid lines in FIG. 1 and in broken lines in FIG. 4, and in this position the trip lever is able to retain the spring arm 14 in the first position of the latter (i.e. parallel with the frame member 12) against the urging of the torque spring 23. The second position is the lower, sprung position, shown in solid lines in FIG. 4, in which the spring arm 14 is released.

More particularly, the trip lever 35 is L-shaped, having a vertical leg 37 and a horizontal leg 38. The trip lever extends upwardly in the form of leg 37 from a pivot location 37' to an elbow 39, and then extends forwardly from the elbow 39 as the leg 38, to terminate in a pan element 40 which is wider than the trip lever itself, and is circular in the embodiment illustrated.

The pivot location 37' at the lower end of the leg 37 includes an extension 41 of the leg 37 (see FIG. 4) projecting downwardly through a suitably dimensioned transverse slot in the frame member 12, and having a pin 42 in an appropriate aperture, in order to retain the leg 37 in position with respect to the frame member 12.

The extension 41 also projects through the leftward end of a spring element 43 which urges the trip lever 35 towards its upper position, i.e. that shown in FIG. 1. More specifically, the spring element 43 is in the form of a "leaf spring", having at its leftward end a transverse slot through which the previously mentioned extension 42 of the leg 37 of the trip lever 35 can pass. The spring element 43 extends upwardly at an oblique angle to terminate at a position intermediate of the length of the leg 37 of the trip lever 35, and rests slidingly against the underside of the leg 38.

As can be seen particularly in FIG. 4, a manually adjustable thumbscrew 45, threadedly engaged with a tapped bore in the frame member 12 at a position rightwardly or forwardly of the leg 37 of the trip lever 35, provides a fulcrum at an intermediate location of the upwardly and obliquely sloping spring element 43, thus causing the latter to maintain a constant upward urging against the underside of the leg 38 of the trip lever 35. Adjustment of the thumbscrew 45 will in turn adjust the amount of downward pressure that is required on the pan 40 in order to move the pan downwardly and spring the trap. Thus if the trap were intended for animals of the size of a raccoon, for example, an appropriate setting of the thumbscrew 45 would avoid the trap being sprung by chipmunks and other small animals.

A protective housing 47 partially covers the spring element 43, and protects the thumbscrew 45 from dirt and the like.

Turning now to the means by which the trip lever is able to retain the spring arm 14 in its downward or "set" position shown in FIG. 1, this includes an aperture 52 in the rightward face of the cylindrical portion 30 on the rightward end of the spring arm 14, and a projection 54 extending leftwardly or rearwardly from the elbow 39 of the trip lever 35, the projection 54 being adapted to engage the aperture 52 when the spring arm 14 is in the lowermost position shown in FIG. 1, thus retaining the spring arm 14 in this position.

It will be appreciated, particularly from an examination of FIG. 4, that downward pressure on the pan 40 will cause the trip lever 35 to rotate in the clockwise sense about the pivot defined by the extension 42, thus causing the trip lever 35 to move from the broken line position to the solid line position in FIG. 4, thus withdrawing the projection 54 from the aperture 52 in the cylindrical portion 30, thus in turn releasing the spring arm 14 to be snapped upwardly in the counter-clockwise direction due to the influence of the torque spring 23.

Attention is now directed to FIGS. 1 and 2, which show the first embodiment of the shock-absorbing apparatus forming a part of the trap shown in FIG. 1.

The apparatus is generally shown by the numeral 55, and includes a resilient member 57 and a non-resilient member 59 as its two basic components. More specifically, the resilient member 57 is constituted, in the embodiment shown, by a coil spring 60 having attachment loops 61 and 62 at its ends. Attachment loop 61 is connected to a ring 64 adapted to be engaged with a peg or stake 66 which is driven into the ground as shown in FIG. 1. The attachment loop 62 is connected to the non-resilient member 59 in a manner which will be explained subsequently.

The non-resilient member 59 is, essentially, an elongated, hairpin-shaped metal clip with a loop 68 at one extremity and two free, adjacent ends 70 at the other extremity. Even more particularly, the metal clip constituting the non-resilient member 59 can be seen in FIG. 2 to be in the form of a single length of metal folded in hairpin fashion to define a first portion 72 where the two folded halves are spaced from each other and substantially parallel, thereby defining the loop 68. A second portion 74 is adjacent the first portion 72, and in the second portion 74 the two halves of the length of metal are in substantial contact with each other. A third portion 75 is adjacent the second portion 74, and in the third portion 75 the two halves of the length of metal diverge and then converge together again, in order to define a lenticular opening 76 which constitutes the part of the metal clip to which the attachment loop 62 of the coil spring 60 is connected. Finally, a fourth portion is adjacent the third portion 75, and extends to the two ends 70. In the fourth portion, the halves of the length of metal are again in contact.

As can be seen in FIGS. 1 and 2, the hairpin-shape metal clip constituting the non-resilient member 59 extends axially through the hollow center of the coil spring 60. It will also be noted in the figures that the ring 64 passes through the loop 68 defined in the first portion 72 of the non-resilient member 59. Thus, the ring 64 is attached both to the coil spring 60 and to the metal clip constituting the non-resilient member 59.

The fourth portion of the non-resilient member 59, i.e. that extending rightwardly from the portion 75 shown in FIG. 2 and terminating in the ends 70, passes through an opening in a coupling member shown generally by the numeral 79. As seen in FIG. 1, the coupling member 79 includes a first wall 80, a second wall 81 in which the opening is provided, a third wall 82, and a fourth wall 83. The walls 80–83 are sequentially connected to each other, and each adjacent pair defines a right angle, so that the complete coupling 79 is substantially in the shape of a rectangle. The walls 80 and 83 are not connected to each other. The wall 83 has an elongated slot upwardly from its lower free edge, the slot being shown by the numeral 85 in FIG. 2. Through the slot passes the end of the cable or wire 19, and the extremity of the cable or wire 19 has attached thereto a crimped rivet 87 which is adapted to release the wire 19 when the pull on it becomes strong enough. Also provided is a washer 89 between the rivet 87 and the wall 83.

As can be seen in FIGS. 1 and 2, the length of the non-resilient member 59 is greater than the length of the resilient member (coil spring) 57, and therefore when a pull is exerted on the wire 19, the coil spring 60 will first be stretched, while the loop 68 slides with respect to the ring 64. However, eventually the non-resilient member 59 will prevent further stretching of the spring 60, thus establishing a limit to the resilient "play" which the wire 19 can have under tension. It is to be understood that the extension of the spring 60 would be limited in such a way that it would not exceed its own elastic limit.

The second embodiment of the shock-absorbing part of the trap is shown in FIG. 3, to which attention is now directed. In FIG. 3, all parts of the apparatus are the same with the exception of the member 59, which in FIG. 3 has been replaced by a simple closed loop 86 of wire, which is looped through the ring 64 at one end, and through a simple cotter pin element 88 at the other end. The cotter pin element 88 passes through the opening in the wall 81 of the coupling member 79. Aside from the replacement of the non-resilient member 59 with the loop of wire 86, and the addition of the cotter pin element 88, all other parts shown in FIG. 3 are the same as those in FIG. 2, and bear the same numerals. In FIG. 3, however, the coupling member 79 is shown in a view at right angles to that of FIG. 2, so that the slot 85 in the wall 83 is seen longitudinally.

It will be understood that the length of the closed loop of wire 86 would be selected in such a way that it would perform the same function as the non-resilient member 59 in the FIG. 2 embodiment. In other words, the loop of wire 86 would be long enough to permit the spring 60 to begin to extend under tension in the wire 19, but would come into play to limit that extension before the spring 60 reached its elastic limit.

The third embodiment of the shock-absorbing portion of the trap is shown in FIG. 5, to which attention is directed. The embodiment of FIG. 5 is identical to that of FIG. 3, with the exception that the closed loop of wire 86' passes through the open center of the coil spring 60, rather than being outside of and independent of the spring 60. Otherwise, all portions in the FIG. 5 embodiment are identical to those in FIG. 3, and therefore these additional portions need not be discussed or described in detail.

In addition to the crimped rivet 87 shown in FIG. 2 within the coupling member 79, there is another crimped rivet at the opposite end of the wire 19, which can be seen at 91 in FIG. 1. Referring to FIG. 1, the curved strap member 92, preferably made of metal, has an aperture adjacent the end 93 through which the wire 19 passes, and has another aperture 95 adjacent the other end. The end of the wire 19 extends through a fork arrangement adjacent the aperture 95, then bends and passes through the aperture 95. On the terminal end of the wire, the crimped rivet 91 is located.

The rivets 87 and 91 are of a type that can be adjusted so that each can release its respective end of the wire 19 at a given pull. This is accomplished by adjusting the force with which the specific rivet is crimped. Since this is a known technology, it need not be detailed here.

It will now be understood that the construction described above and shown in the drawings is such as to prevent over-stretching of the spring 60, and also to snub the spring in order that excessive force becomes transferred to other parts of the snare. Specifically, the front end crimped rivet 91 can be adjusted to release at the lowest pull force, but if this fails then the rivet 87 within the coupling member 79 can be adjusted to release. This arrangement increases capture selectivity of the trap.

As an example, in the trapping of foxes it may be desired that the spring absorb a maximum of 150 lbs. of force, which is the typical pull caused by the animal lunging. Thus, the snubber length can be set to allow the spring to extend sufficiently absorb only the 150 lbs. However, if a deer or a bear or a large dog should get caught, then the maximum extension equal to 150 lbs. force (corresponding to the length of the snubber) will be quickly reached as the larger animal lunges, and the extra force (that beyond 150 lbs.) will then be transferred to the rest of the snare. If the rivets are properly adjusted, the rivet 91 at the front end (the snare lock end) will pop off and release the animal unharmed. If the rivet 91 fails to release, and the rivet 87 within the coupling member 79 releases first, then the wire 19 will be carried away with the animal, but will fall off the animal as the animal runs away.

For medium size animals, a convenient setting would be one in which the front end rivet 91 would open up at about 300 lbs. of force, the rivet 87 would open up at about 350 lbs. of force, and the swivel 79 itself would open up at about 450 lbs.

For smaller animals, for example the Scottish wild cat (similar in size to domestic cats) the front end rivet 91 could be pinched very lightly, so that it would release at approximately 50–70 lbs.

I claim:

1. In an animal trap having a portion which attaches to an animal when the latter springs the trap, said portion being capable of being affixed with respect to the terrain, the improvement according to which there is provided a shock-absorbing apparatus through which said portion can be affixed with respect to the terrain, the apparatus comprising:
(a) a resilient member inserted between (1) a connection between said portion and said apparatus and (2) a location where said apparatus is affixed with respect to the terrain, whereby if the trapped animal should lunge away from the trap, the resilient member will extend and absorb at least some of the resulting shock so that injury to the animal is minimized, and
(b) a non-resilient member attached between said connection and said location, said non-resilient member limiting the extension of said resilient member such that the latter does not exceed its elastic limit during extension, the resilient member being a coil spring and the non-resilient member being a closed loop of wire which passes through the center of the coil spring and is inter-linked with a ring adapted to engage a stake driven into the ground, the coil spring being also connected to said ring.

2. In an animal trap having a portion which attaches to an animal when the latter springs the trap, said portion being capable of being affixed with respect to the terrain, the improvement according to which there is provided a shock-absorbing apparatus through which said portion can be affixed with respect to the terrain, the apparatus comprising:
(a) a resilient member inserted between (1) a connection between said portion and said apparatus and (2) a location where said apparatus is affixed with respect to the terrain, whereby if the trapped animal should lunge away from the trap, the resilient member will extend and absorb at least some of the resulting shock so that injury to the animal is minimized, and
(b) a non-resilient member attached between said connection and said location, said non-resilient member limiting the extension of said resilient member such that the latter does not exceed its elastic limit during extension, the resilient member being a coil spring, the non-resilient member being an elongated, hairpin-shaped metal clip having a loop at one extremity and two free, adjacent ends at the other extremity, the loop being connected to a ring adapted to engage a stake driven into the ground, said free ends being attached to a coupling member to which the said portion is also connected, the metal clip passing axially through said coil spring, the coil spring being connected at one end to said ring and at the other end to a part of the metal clip adjacent to coupling member.

3. The invention claimed in claim 2, in which the metal clip is in the form of a single length of metal folded in hairpin fashion to define a first portion where the two folded halves are spaced from each other and substantially parallel, a second portion adjacent said first portion where the two halves are in substantial contact with each other, a third portion adjacent said second portion, where the two halves diverge and then converge in order to define a lenticular opening constituting the said part of the metal clip to which the said other end of the coil spring is connected, and a fourth portion adjacent said third portion and extending to the said two ends.

4. The invention claimed in claim 2, in which the said coupling member has an opening through which said two free ends of the metal clip project, the ends being spread apart to prevent withdrawal of the metal clip from the coupling member, the coupling member forming part of said apparatus and being connected to said portion of the trap which attaches to the animal.

* * * * *